United States Patent [19]

Modic et al.

[11] Patent Number: 4,859,737
[45] Date of Patent: Aug. 22, 1989

[54] POLYMERIC COMPOSITION

[75] Inventors: Michael J. Modic; Richard Gelles, both of Houston, Tex.

[73] Assignee: Shell Oil Company, Houston, Tex.

[21] Appl. No.: 124,644

[22] Filed: Nov. 24, 1987

[51] Int. Cl.$^4$ ............................................. C08L 67/02
[52] U.S. Cl. .................................. 525/64; 525/92; 525/176; 525/177
[58] Field of Search .................... 525/64, 92, 176, 177

[56] References Cited

U.S. PATENT DOCUMENTS

| | | | |
|---|---|---|---|
| 2,265,765 | 12/1941 | Schultz et al. | 200/126 |
| 2,465,395 | 3/1949 | O'Rear | 102/74 |
| 3,047,539 | 7/1962 | Pengilly | 260/75 |
| 3,135,716 | 6/1964 | Uraneck et al. | 260/45.5 |
| 3,150,209 | 9/1964 | Short et al. | 260/894 |
| 3,231,635 | 1/1966 | Holden et al. | 260/880 |
| 3,322,856 | 5/1967 | Holden et al. | 260/876 |
| 3,496,154 | 2/1970 | Wofford | 260/84.7 |
| 3,498,960 | 3/1970 | Wofford | 260/84.7 |
| 3,598,882 | 8/1971 | Brinkmann | 525/177 |
| 3,700,633 | 10/1972 | Wald et al. | 260/880 |
| 3,953,404 | 4/1976 | Borman | 260/75 M |
| 3,976,628 | 8/1976 | Halasa et al. | 526/22 |
| 3,985,830 | 10/1976 | Fetters et al. | 260/880 B |
| 4,101,605 | 7/1978 | Gergen et al. | 260/873 |
| 4,145,298 | 3/1979 | Trepka | 252/51.5 |
| 4,156,673 | 5/1979 | Eckert | 260/33.6 |
| 4,220,735 | 9/1980 | Dieck et al. | 525/90 |
| 4,223,106 | 9/1980 | Bier | 525/176 |
| 4,238,202 | 12/1980 | Trepka et al. | 44/62 |
| 4,578,429 | 3/1986 | Gergen et al. | 525/291 |
| 4,657,970 | 4/1987 | Shiraki et al. | 525/57 |

FOREIGN PATENT DOCUMENTS 1030306  8/1964  United Kingdom.

*Primary Examiner*—Patricia Short

[57] ABSTRACT

A polyester resin composition comprising a poly(alkylene terephthalate), said alkylene radical containing at least 3 carbon atoms, a carboxylated hydrogenated or selectively hydrogenated conjugated diolefin polymer and a transesterification catalyst. It has surprisingly been discovered that when a transesterification catalyst such as p-toluene sulfonic acid is present at a concentration within the range from about 1 mmoles to about 5 mmoles per 100 g of combined polyester and carboxylated, hydrogenated or selectively hydrogenated conjugated diolefin polymer, a significant improvement in impact strength is realized. Inclusion of a transesterification catalyst in the composition, then, enables significant improvement in impact strength even when the carboxylated, hydrogenated or selectively hydrogenated conjugated diolefin polymer is present in the composition at a concentration as low as 17 parts, by weight, per 100 parts, by weight, of polyester. The poly(alkylene terephthalate) is preferably poly(butylene terephthalate). The carboxylated, hydrogenated or selectively hydrogenated conjugated diolefin polymer is preferably an unsaturated block copolymer comprising at least one polymeric block containing predominantly monoalkenyl aromatic hydrocarbon monomer units and at least one polymeric block containing predominantly conjugated diolefin monomer units. Most preferably, the carboxylated elastomeric polymer is a maleated, selectively hydrogenated styrene-butadiene-styrene triblock copolymer.

11 Claims, No Drawings

POLYMERIC COMPOSITION

BACKGROUND OF THE INVENTION

1. Field of Invention

This invention relates to a polymeric composition. More particularly, this invention relates to a thermoplastic polyester resin composition.

2. Prior Art

The use of thermoplastic polyesters in various applications is, of course, well known in the prior art. Such polymers are particularly useful in the preparation of molded structures. In general, the molded structures may be prepared via injection molding, compression molding, transfer molding and the like. Depending upon the particular end use, the thermoplastic polyester may be combined with other polymers, oils, fillers, reinforcing agents, antioxidants, stabilizers, fire retardants, antiblocking agents and the like.

In general, products fashioned with thermoplastic polyester resins exhibit good rigidity, heat resistance and electrical characteristics. The molded products do not, however, generally exhibit good impact resistance. As a result, polymeric compositions comprising a thermoplastic polyester as the sole polymeric component frequently cannot effectively be used in the preparation of many molded products. Moreover, the poor impact strength has, to some extent at least, restricted the use of such polymer compositions in other end use applications.

Heretofore, several techniques have been proposed for improving the impact resistance of shaped articles fashioned from a thermoplastic polyester. In general, these methods involve the incorporation of an elastomeric polymer into a polymeric composition comprising the thermoplastic polyester. In this regard, block copolymers comprising at least one monoalkenyl aromatic hydrocarbon polymer block and at least one conjugated diolefin polymer block are known to improve the impact strength of thermoplastic polyester resin composition products. Generally, the conjugated diolefin block will be selectively hydrogenated so as to improve weatherability and heat resistance. The elastomeric block copolymer may be incorporated so as to form an interlocking network as taught in U.S. Pat. No. 4,101,605. The block copolymer may also, in effect, simply be admixed with the thermoplastic polyester as taught in U.S. Pat. No. 4,220,735. The block copolymer may also be modified by grafting an unsaturated carboxylic acid or a derivative thereof onto the block copolymer before physically admixing the same with the polyester as taught in U.S. Pat. No. 4,657,970. The thermoplastic polyester resin compositions obtained via physical admixture of the components are, however, frequently, not stable and phase separation often occurs between the polyester and the block copolymer.

While the incorporation of an elastomeric block copolymer or a modified derivative thereof into a thermoplastic polyester resin composition frequently leads to the production of a product having improved impact strength, the amount of block copolymer required is frequently relatively excessive. The improved impact resistance is, then, frequently obtained at the expense of other desirable properties characteristic of thermoplastic polyester resin products. Moreover, the selectively hydrogenated block copolymers are relatively expensive. As a result, even when the selectively hydrogenated block copolymers are used as a modifier in a thermoplastic polyester resin composition, they frequently are not used at a high enough concentration to yield a maximum impact strength. The need, then, for an improved modifier composition for use in thermoplastic polyester resin compositions which will be effective at lower concentrations and not subject to phase separation is believed to be readily apparent.

SUMMARY OF THE INVENTION

It has now been discovered that the foregoing and other disadvantages of the prior art thermoplastic polyester resin compositions can be overcome or at least significantly reduced with the thermoplastic polyester composition of this invention. It is, therefore, an object of the present invention to provide an improved thermoplastic polyester resin composition. It is another object of this invention to provide such a thermoplastic polyester resin composition which may be stored and used with reduced threat of phase separation as between the polyester and the impact modifier. It is still another object of the present invention to provide a thermoplastic polyester resin composition, which will yield molded products having improved impact resistance. The foregoing and other objects and advantages will become apparent from the description set forth hereinafter.

In accordance with the present invention, the foregoing and other objects and advantages are accomplished by incorporating a modified, hydrogenated or selectively hydrogenated conjugated diolefin polymer and an acid or an acid compound capable of catalyzing a transesterification reaction into a polyester resin composition. The hydrogenated or selectively hydrogenated conjugated diolefin polymer useful in the composition of this invention will be modified by incorporating at least one carboxyl group therein. The hydrogenated or selectively hydrogenated conjugated diolefin polymer may be a homopolymer or a copolymer. When the hydrogenated or selectively hydrogenated conjugated diolefin polymer is a copolymer, it is important that the copolymer contain at least about 35 wt % conjugated diolefin monomer units before hydrogenation. The hydrogenated or selectively hydrogenated conjugated diolefin copolymers useful in the composition of this invention may be random, tapered or block.

DETAILED DESCRIPTION OF THE INVENTION

As indicated supra, the present invention relates to a thermoplastic polyester resin composition comprising a carboxylated, hydrogenated or selectively hydrogenated conjugated diolefin polymer and an acid or acid compound capable of catalyzing a transesterification reaction. The hydrogenated or selectively hydrogenated conjugated diolefin polymer may be a homopolymer or a copolymer and may sometimes be referred to herein as an elastomer or an elastomeric polymer. When the hydrogenated or selectively hydrogenated conjugated diolefin polymer is a copolymer, it is important that the copolymer contain at least about 35wt % of one or more conjugated diolefin monomer units. When the hydrogenated or selectively hydrogenated conjugated diolefin polymer is a copolymer, the copolymer may be random, tapered or block.

The thermoplastic polyesters useful in the thermoplastic polyester resin composition of this invention are the poly(alkylene terephthalate) polymers wherein the alkylene group contains at least 3 carbon atoms. Suitable thermoplastic polyesters include poly(propylene terephthalate); poly(1,3-butylene terephthalate); poly(1,4-butylene terephthalate); poly(pentylene terephthalate); and the like. Many of the thermoplastic polyesters useful in the composition of this invention are available commercially and all such polyesters can be prepared by known techniques such as by the alcoholysis of esters of terephthalate acid with propylene glycols, butanediols, pentanediols, and the like. Such thermoplastic polyesters may also be prepared by heating the glycol or polyol with the free acids or with halide derivatives thereof. Methods for preparing such are described, for example, in U.S. Pat. Nos. 2,465,319 and 3,047,539 the disclosure of which patents are herein incorporated by reference. In general, the poly(alkylene terephthalate) polymers may be straight or branched chained. Branched chained poly(alkylene terephthalate) polymers, particularly poly(1,4-butylene terephthalate), and their method of preparation is described in U.S. Pat. No. 3,953,404, the disclosure of which patent is herein incorporated by reference. In general, the thermoplastic polyesters useful in the compositions of this invention will have intrinsic viscosities of at least about 0.4 deciliters/g as measured in a 60:40 phenol/tetrachloroethane mixture at 30° C.

In general, any elastomer containing conjugated diolefin monomer units may be hydrogenated or selectively hydrogenated, then carboxylated and used in the thermoplastic polyester composition of this invention. Useful elastomers, then, include those prepared in bulk, suspension, solution or emulsion. As is well known, polymerization of monomers to produce an elastomer may be accomplished using free-radical, cationic and anionic initiators or polymerization catalysts.

As is well known, hydrogenated or selectively hydrogenated conjugated diolefin polymers containing residual ethylenic unsaturation may be carboxylated simply by heating the polymer in the presence of an ethylenically unsaturated carboxylic acid and/or carboxylic acid anhydride. The carboxylic acid and/or anhydride may be monofunctional such as acrylic, methacrylic, cinnamic, crotonic, isocrotonic, mesaconic, α-methylmesaconic and the like or polyfunctional such as maleic, fumeric, itaconic, citraconic and the like. As is known in the prior art, carboxylation which is accomplished thermally in this manner occurs through the so called ENE reaction and incorporation of a carboxylic acid chain onto the polymer backbone is possible. As is also known in the prior art, hydrogenated or selectively hydrogenated conjugated diolefin polymers which may or may not contain residual ethylenic unsaturation may be carboxylated by free radical grafting of an unsaturated acid onto the polymer at an elevated temperature either thermally or in the presence of a free-radical initiator. Grafting via a free radical mechanism is taught, for example, in U.S. Pat. No. 4,578,429, the disclosure of which patent is herein incorporated by reference. Incorporation of the carboxylic acid group or groups via this technique may, however, result in cleavage of the polymer backbone with the carboxyl group or groups being incorporated at the end of one or both of the cleaved segments. As is further known in the prior art, hydrogenated or selectively hydrogenated conjugated diolefin polymers which may or may not contain residual ethylenic unsaturation may be carboxylated by first metallating the polymer and then contacting the metallated polymer with a suitable functionalizing agent such as $CO_2$ and then with a proton donor such as an acid. Metallization may, of course, be accomplished using techniques known in the prior art such as the method taught in U.S. Pat. No. 3,976,628, the disclosure of which patent is herein incorporated by reference. As is still further known in the prior art, polymers prepared via anionic initiation may be carboxylated simply by reacting the living polymer with a suitable carboxylating agent such as $CO_2$ and then with a proton donor such as an acid. Carboxylation in this manner can incorporate up to two carboxyl groups, one on each end, when the anionic initiator used during polymerization contained two alkali metal atoms. As is even further known in the prior art, a certain amount of care must be exercised when reacting $CO_2$ with a metallated polymer, including a living polymer prepared by anionic initiation, to avoid coupling of two or more polymer segments thereby reducing the number of carboxyl groups available. In general, carboxylated conjugated diolefin polymers useful in the thermoplastic polyester resin compositions of this invention will contain from about 0.01 wt % to about 20 wt % —$CO_2H$ groups.

While all of the methods described above can be used to effect carboxylation of the elastomer useful in the thermoplastic polyester resin composition of this invention when residual unsaturation is present in the conjugated diolefin polymer, carboxylation of the polymer via grafting through a free radical mechanism such as that taught in U.S. Pat. No. 4,578,429 is preferred. This preference is due primarily to the fact that residual ethylenic unsaturation in the conjugated diolefin frequently will be minimal after hydrogenation is complete.

Elastomeric, conjugated diolefin homopolymers and copolymers which may subsequently be hydrogenated or selectively hydrogenated and used in the polyester compositions of this invention may be prepared, for example, by contacting the monomer or monomers with an organo alkali metal compound in a suitable solvent at a temperature within the range from about −150° C. to about 300° C., preferably at a temperature within the range from about 0° C. to about 100° C. Particularly effective polymerization initiators are organolithium compounds having the general formula:

$RLi_n$ 

wherein:
R is an aliphatic, cycloaliphatic or aromatic hydrocarbon radical having from one to about twenty carbon atoms; and
n is an integer of from one to four.

In general, the conjugated diolefin polymers useful in the present invention will have a molecular weight within the range from about 20,000 to about 450,000 and, as indicated supra, when the conjugated diolefin polymer is a copolymer of one or more diolefins and one or more other monomers, the conjugated diolefin polymer will comprise at least about 35 wt % monomeric diolefin units.

Elastomeric homopolymers and copolymers useful in the present invention include those homopolymers and copolymers described, for example, in U.S. Pat. Nos. 3,135,716; 3,150,209; 3,496,154; 3,498,960; 4,145,298 and 4,238,202, the disclosure of which patents are herein incorporated by reference. In general, the elastomers taught by these patents may be polymers of one or more conjugated dienes containing from four to about twelve carbon atoms such as 1,3-butadiene, isoprene, piperylene, methylpentadiene, phenylbutadiene, 3,4-dimethyl-1,3-hexadiene, 4,5-diethyl-1,3-octadiene and the like, preferably those conjugated diolefins containing 4 to about 8 carbon atoms. Moreover, one or more of the hydrogen atoms in these conjugated diolefins may be substituted with halogen. The elastomeric polymers taught by these patents may also be copolymers of one or more of the aforementioned conjugated diolefins and one or more other monomers. Other monomers which may be used include aryl-substituted olefins such as styrene, various alkyl-substituted styrenes, paraalkoxystyrenes, vinyl naphthalene, vinyl toluene and the like.

In addition to the foregoing polymers, other polymers and particularly linear and radial block copolymers useful in the present invention may be prepared, in effect, using the methods described, for example, in U.S. Pat. Nos. 3,231,635; 2,265,765; 3,322,856; 3,985,830 and 4,156,673, the disclosure of which patents are herein incorporated by reference. In general, block copolymers which may be hydrogenated and used in the polyester resin compositions of the present invention, which block copolymers may, in effect, be prepared with one or more of the methods described in the aforementioned patents may be represented by one of the following general formulae:

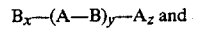

$B_x$—(A—B)$_y$—A$_z$ and

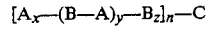

[A$_x$—(B—A)$_y$—B$_z$]$_n$—C wherein:
A is a polymeric block containing predominately monoalkenyl aromatic hydrocarbon monomer units;
B is a polymeric block containing predominantly conjugated diolefin monomer units;
x and z are, independently, a number equal to 0 or 1:
y is a whole number from 0 to 15:
n is a number from 3 to 15 as determined by GPC on a polystyrene scale; and
C is the core of a radial polymer formed with a polyfunctional coupling agent.

As used herein in connection with block copolymer composition, the recitation "predominantly" is intended to mean that the specified monomer type constitutes at least 85 wt %, preferably 95 wt % and most preferably substantially 100 wt %, of the specified monomer. Other monomers that may be contained within the block include essentially any monomer or monomers copolymerizable with the specified monomer but generally would be the monomer or monomers incorporated into one or more other blocks within the block copolymer. The linear block copolymers may be prepared by first polymerizing a block A or a block B until the monomer used therein is substantially completely polymerized and then adding monomer to polymerize a different block B or A and continuing the alternate polymerization of monomer until the desired block copolymer has been prepared. In general, the weight-average molecular weight of the A blocks will be within the range from about 2,000 to about 115,000 and the weight-average molecular weight of the B blocks will be within the range from about 20,000 to about 300,000. The radial block copolymers will be prepared by coupling a plurality of linear block copolymers with a suitable polyfunctional coupling agent.

After the conjugated diolefin polymer has been prepared, the polymer will then be hydrogenated so as to convert (saturate) at least about 80% of the ethylenic unsaturation initially contained in the polymer using methods well known in the prior art. When the conjugated diolefin polymer contains only ethylenic unsaturation, the polymer will, simply, be hydrogenated. When the conjugated diolefin polymer contains aromatic unsaturation, however, the polymer will be selectively hydrogenated so as to avoid conversion (saturation) of a significant amount of the aromatic unsaturation. In general, the hydrogenation methods known in the prior art involve the use of a suitable catalyst, particularly a catalyst or catalyst precursor comprising a Group VI or Group VIII metal atom. Suitable catalysts or catalyst precursors are described in U.K. Patent Specification No. 1,030,306, the disclosure of which patent specification is herein incorporated by reference. A particularly preferred method for hydrogenating the elastomeric (conjugated diolefin) polymer useful in the thermoplastic polyester resin compositions of this invention is described in U.S. Pat. No. 3,700,633, the disclosure of which patent is herein incorporated by reference. In the process taught in U.S. Pat. No. 3,700,633, hydrogenation is accomplished in a suitable solvent, preferably the same solvent as was used to prepare the polymer, with a catalyst prepared by combining (reacting) an aluminum alkyl and a nickel or cobalt carboxylate or alkoxide. In general, hydrogenation is accomplished at a temperature within the range from about 25° C. to about 175° C. at a hydrogen partial pressure below about 5,000 psig, and usually at a hydrogen partial pressure within the range from about 250 psig to about 1,500 psig. In general, holding times within the range from about five minutes to about eight hours will be sufficient to permit the desired degree of hydrogenation. When the conjugated diolefin polymer contains aromatic unsaturation, relatively mild hydrogenation condition e.g., temperatures below about 175° C. and hydrogen partial pressures below about 800 psig will minimize, if not eliminate, any hydrogenation of the aromatic unsaturation.

In general, the compositions of this invention may comprise one or more of any of the compounds known in the prior art to be useful as transesterification catalysts. Compounds known to be useful as transesterification catalysts include the inorganic acids, particularly the mineral acids, organic acids, inorganic acids containing hydrocarbyl substituents and Lewis acids. The sulfonic acids and particularly sulfonic acids containing hydrocarbyl-substitution such as p-toluene sulfonic acid, naphthalene sulfonic acid and the like, are particularly effective transesterification catalysts and are, therefore, preferred for use in the present invention. The most preferred transesterification catalyst for use in the thermoplastic polyester resin compositions of this invention is p-toluene sulfonic acid.

While not wishing to be bound by any particular theory, it is believed that a reaction actually occurs between the carboxylated conjugated diolefin polymer and the polyester thereby chemically incorporating at least a portion of the carboxylated elastomeric polymer with some part or portion of the polyester. This chemical bonding, then improves the compatibility of the carboxylated conjugated diolefin polymer and the polyester. While still not wishing to be bound by any particular theory, it is also believed that this reaction reduces the interfacial tension between the polyester and the impact modifying polymer thereby reducing the particle size of the conjugated diolefin polymer distributed throughout the polyester resin composition. It is also believed that the transesterification catalyst changes the molecular weight distribution of the polyester, thereby making the polyester easier to impact modify.

In general, the thermoplastic polyester resin compositions of this invention will comprise from about 1 wt % to about 99 wt % of a thermoplastic polyester, from about 1 to about 50 parts, by weight, of a carboxylated elastomeric polymer per 100 parts of polyester and from about 1 mmoles to about 5 mmoles (g moles) of an acidic transesterification catalyst per 100 g of combined polyester and carboxylated conjugated diolefin polymer in the composition. The polyester resin composition may also comprise a filler, a reinforcing agent, fire retardants and the like. When used, these materials will be used at concentrations well known in the prior art. The thermoplastic polyester resin composition may also comprise one or more pigments, colorants, lubricants, stabilizers, and the like. Again, these materials, when used, will be added at concentrations well known in the prior art.

In general, the ingredients of the base thermoplastic polyester resin composition; i.e., the thermoplastic polyester, the carboxylated elastomer and the transesterification catalyst may be combined using any of the suitable known techniques. Suitable methods, then, include simple admixture of the various components in their natural state; solution admixture which involves forming a solution of the components, combining the solutions and then evaporating the solvents; molten and/or liquid phase admixture and the like. Of these, molten and/or liquid phase admixture is, generally, most convenient and is, therefore, preferred. Molten phase admixture in a heated extruder is most preferred. Such admixture is, of course, particularly advantageous when the composition is ultimately used in an injection molding application.

PREFERRED EMBODIMENT

In a preferred thermoplastic polyester resin composition, a maleated, selectively hydrogenated block copolymer comprising at least two polymeric blocks containing predominantly monoalkenyl aromatic hydrocarbon monomer units and at least one polymeric block comprising predominantly conjugated diolefin monomer units will be combined with p-toluene sulfonic acid and used as an impact modifier with a poly(butylene terephthalate) polyester. In the preferred embodiment, the selectively hydrogenated block copolymer will contain from about 0.5 wt % to about 3.0 wt % —$CO_2H$ groups. In the preferred embodiment, the maleated, selectively hydrogenated block copolymer will comprise from about 50 wt % to about 95 wt % hydrogenated conjugated diolefin monomer units and from about 5 wt % to about 50 wt % monoalkenyl aromatic hydrocarbon monomer units. In the preferred embodiment, the base thermoplastic polyester resin composition will comprise from about 75 wt % to about 85 wt % poly(butylene terephthalate) polyester, from about 17 to about 33 parts, by weight, block copolymer per 100 parts, by weight, polyester and from about 1 mmoles to about 3 mmoles (g moles) of p-toluene sulfonic acid per 100 g of combined polyester and maleated, selectively hydrogenated block copolymer. In the preferred embodiment, the maleated, selectively hydrogenated block copolymer will comprise from about 1.5 wt % to about 2.5 wt % maleic acid or anhydride monomer units and at least about 95% of the ethylenic unsaturation initially contained in the polymer will be converted (saturated) with hydrogen. In the preferred embodiment, the monoalkenyl aromatic hydrocarbon polymer blocks will have a weight-average molecular weight within the range from about 5,000 to about 50,000 and the conjugated diolefin polymer blocks will have a weight-average molecular weight within the range from about 30,000 to about 150,000. In a most preferred thermoplastic polyester resin composition, the block copolymer will contain terminal polystryene blocks and a central selectively hydrogenated polybutadiene block. In a preferred embodiment of the present invention, the components of the thermoplastic polyester resin composition will be combined in a two-screw extruder operated at a temperature within the range from about 240° C. to about 280° C. The preferred and most preferred thermoplastic polyester resin compositions of this invention are particularly useful in the preparation of molded articles.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, four thermoplastic polyester resin compositions were prepared for the purpose of determining the effect of a maleated, selectively hydrogenated triblock copolymer on impact strength at different triblock copolymer concentrations. Each of the four compositions were prepared with a poly(butylene terephthalate) available under the tradename "Valox 310" from General Electric Company and three of the four compositions contained maleated and selectively hydrogenated A-B-A triblock copolymer wherein each A was a polystyrene block having a weight-average molecular weight of 7,800 and B was a selectively hydrogenated polybutadiene block having a weight-average molecular weight of 35,000. The triblock copolymer contained about 1.75 wt % maleic anhydride units. The first of the four compositions was prepared without any of the maleated, selectively hydrogenated A-B-A triblock copolymer, the second of the four compositions contained 90 wt % of the polyester and 10 wt % of the maleated, selectively hydrogenated A-B-A triblock copolymer, the third of the compositions contained 80 wt % of the polyester and 20 wt % of the maleated, selectively hydrogenated A-B-A triblock copolymer, and the fourth of the compositions contained 70 wt % of the polyester and 30 wt % of the maleated, selectively hydrogenated A-B-A triblock copolymer. For convenience, these compositions are hereinafter referred to, respectively, as Composition Nos. 1, 2, 3 and 4. Each of the four thermoplastic polyester resin compositions were prepared by combining the polymeric components in a twin-screw extruder operated at about 245° C. After the thermoplastic polyester resin composition was prepared, a portion thereof was molded into a shape suitable for determining the notched Izod impact strength in ft-lb/in using ASTM D256. The notched Izod value was determined for the first and second compositions only at room temperature while t he notched Izod values of the third and fourth compositions were determined room temperature, −20° F. and −40° F. The results obtained with each composition are summarized in the following Table:

TABLE

| Composition Number | Notched Izod (ft-lb/in) | | |
|---|---|---|---|
| | RT | −20° F. | −40° F. |
| 1 | 1.1 | — | — |
| 2 | 3.2 | — | — |
| 3 | 3.9 | 1.1 | 1.0 |
| 4 | 18.2* | 2.0 | 1.8 |

*indicates blend which failed in a ductile manner.

From the data summarized in the preceding Table, it is apparent that there was no significant change in impact strength until the concentration of the maleated selectively hydrogenated A-B-A triblock copolymer reached about 30 wt %.

EXAMPLE 2

In this example, a series of thermoplastic polyester resin compositions identical to those prepared in Example 1 except that varying amounts of p-toluene sulfonic acid were incorporated into the thermoplastic polyester resin composition. The first two compositions prepared in this example, hereinafter referred to as Compositions 5 and 6, were identical to Composition 1 in Example 1 except that in the first (Composition 5) 0.25 wt % of p-toluene sulfonic acid was added and in the second (Composition 6) 0.50 wt % p-toluene sulfonic acid was added. The third, fourth and fifth compositions prepared in this example, which are hereinafter referred to as Compositions 7, 8 and 9, respectively, were identical to Composition 2 of Example 1 except that in the first (Composition 7) 0.15 wt % p-toluene sulfonic acid was added, in the second of these (Composition 8) 0.25 wt % p-toluene sulfonic acid was added and in the third of these (Composition 9) 0.50 wt % p-toluene sulfonic acid was added. The sixth, seventh, eighth and ninth compositions prepared in this example, which compositions are hereinafter referred to, respectively, as Composition Nos. 10, 11, 12 and 13, were identical to Composition 3 of Example 1 except that p-toluene sulfonic acid was added in the following amounts: 0.10 wt % in Composition 10, 0.25 wt % in Composition 11, 0.50 wt % in Composition 12 and 1.00 wt % in Composition 13. The tenth and eleventh compositions prepared in this example, which compositions are hereinafter referred to as Compositions 14 and 15, respectively, were identical to Composition 4 of Example 1 except that 0.25 wt % of p-toluene sulfonic acid was added to the first (Composition 14) and 0.50 wt % of p-toluene sulfonic acid was added to the second (Composition 15). After preparation, a portion of each of the compositions prepared in this example were shaped into a suitable structure and the notched Izod value again determined using the same method as indicated in Example 1. The notched Izod values for Compositions 6–9, 10 and 13 were determined only at room temperature. The notched Izod value was, however, determined for the other composition at room temperature −20° F. and −40° F. In addition, the flexual modulus (flex mod) in kilopounds per square inch (kpsi) using ASTM D790 was determined for all of the molded structures including those prepared in Example 1. The results obtained on structures prepared with each of the compositions of this example as well as the results obtained on the shaped products prepared with the compositions of Example 1 are summarized in the following Table:

TABLE

| Composition Number | p-toluene Sulfonic Acid, wt % | Notched Izod (ft-lb/in) | | | Flex Mod (kpsi) |
|---|---|---|---|---|---|
| | | RT | −20° F. | −40° F. | |
| 1 | 0.0 | 1.1 | — | — | 350 |
| 5 | 0.25 | 0.9 | — | — | 368 |
| 6 | 0.50 | 1.2 | — | — | 360 |
| 2 | 0.0 | 3.2 | — | — | 294 |
| 7 | 0.15 | 2.9 | — | — | 297 |
| 8 | 0.25 | 2.5 | — | — | 313 |
| 9 | 0.50 | 2.7 | — | — | 279 |
| 3 | 0.0 | 3.9 | 1.1 | 1.0 | 270 |
| 10 | 0.10 | 3.0 | — | — | 266 |
| 11 | 0.25 | 15.5* | 2.1 | 1.6 | 238 |
| 12 | 0.50 | 15.1* | 1.4 | 1.3 | 216 |
| 13 | 1.00 | 1.4 | — | — | 209 |
| 4 | 0.0 | 18.2* | 2.0 | 1.8 | 221 |
| 14 | 0.25 | 19.6* | 2.0 | 1.6 | 190 |
| 15 | 0.50 | 19.9* | 2.1 | 1.6 | 216 |

*indicates blends which have failed in a ductile manner.

From the data summarized in the preceding Table, it is apparent that significant improvement in impact strength is realized with as little as 20 wt % maleated, selectively hydrogenated block copolymer in the composition when the concentration of p-toluene sulfonic acid is 0.25 wt % and 0.50 wt % (cf. Compositions 11 and 12). The improvement in impact strength, however, dropped off rapidly as the amount of p-toluene sulfonic acid added was increased and, indeed, the notched Izod value was impaired (less than the value without p-toluene sulfonic acid) when the concentration of p-toluene sulfonic acid was 1.00 wt % (cf. Composition 13). Careful analysis of the data obtained in this and subsequent compositions suggest that a significant improvement in impact resistance will be realized when the concentration of block copolymer is at least about 15 wt % and when the concentration of p-toluene sulfonic acid is within the range from about 1 mmoles to about 3 mmoles of p-toluene sulfonic acid per 100 g of combined polyester and maleated, selectively hydrogenated block copolymer. As is also apparent from the data summarized in the preceding table, improvement is realized when p-toluene sulfonic acid is present and the composition contains 30 wt % block copolymer. The improvement is, however, less significant than at lower block copolymer concentrations. Again, careful analysis of the data suggest that maximum improvement will be realized when the carboxylated, selectively hydrogenated polymer content is within the range from about 15 wt % to about 25 wt % in the composition or when there are from about 17 parts to about 33 parts of maleated, selectively hydrogenated block copolymer per 100 parts of polyester.

While the present invention has been described and illustrated by reference to particular embodiments thereof, it will be appreciated by those of ordinary skill in the art that the invention lends itself to variations not necessarily described or illustrated herein. For this reason, then, reference should be made solely to the appended claims for purposes of determining the true scope of the present invention.

Having thus described and illustrated the invention, what is claimed is:

1. A thermoplastic polyester resin composition comprising from about 75 weight percent to about 85 weight percent of a polybutylene terephthalate, a carboxylated, hydrogenated or selectively hydrogenated conjugated diolefin polymer and an acidic transesterification catalyst, said diolefin polymer being hydrogenated to remove at least 95% of the original ethylenic unsaturation, the diolefin polymer and the transesterification catalyst being present in amounts effective to give ductile failure using ASTM D256.

2. The thermoplastic polyester resin composition of claim 1 wherein said conjugated diolefin polymer contains at least about 35 wt % conjugated diolefin monomer units.

3. The thermoplastic polyester resin composition of claim 2 wherein said carboxylated, hydrogenated or selectively hydrogenated conjugated diolefin polymer contains from about 0.01 wt % to about 20 wt % —$CO_2H$ groups.

4. The thermoplastic polyester resin composition of claim 3 wherein said carboxylated, hydrogenated or selectively hydrogenated conjugated diolefin polymer contains from about 0.5 wt % to about 3 wt % —$CO_2H$ groups.

5. The thermoplastic polyester resin composition of claim 2 wherein said conjugated diolefin polymer is a copolymer.

6. The thermoplastic polyester resin composition of claim 5 wherein said conjugated diolefin polymer is a block copolymer comprising at least one polymeric block containing predominantly monoalkenyl aromatic hydrocarbon monomer units and at least one polymeric block containing predominantly conjugated diolefin monomer units.

7. The thermoplastic polyester resin composition of claim 6 wherein said block copolymer is a triblock copolymer comprising two monoalkenyl hydrocarbon aromatic polymer blocks and one conjugated diolefin polymer block.

8. The thermoplastic polyester resin composition of claim 7 wherein said monoalkenyl aromatic hydrocarbon is styrene and said conjugated diolefin is butadiene.

9. The thermoplastic polyester resin composition of claim 8 wherein said poly(butylene terephthalate) has an intrinsic viscosity of at least about 0.4 deciliters/g.

10. The thermoplastic polyester resin composition of claim 9 wherein said transesterification catalyst is p-toluene sulfonic acid.

11. The thermoplastic polyester resin composition of claim 10 wherein said block copolymer is present at a concentration of about 20% by weight of the composition.

* * * * *